(12) United States Patent
Kishore et al.

(10) Patent No.: US 7,610,325 B2
(45) Date of Patent: Oct. 27, 2009

(54) SYSTEM(S), METHOD(S), AND APPARATUS FOR DETECTING END OF SLICE GROUPS IN A BITSTREAM

(75) Inventors: Chhavi Kishore, Jayanagar Bangalore (IN); Jagannath Sathyanarayana Shastry, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 974 days.

(21) Appl. No.: 11/092,209

(22) Filed: Mar. 29, 2005

(65) Prior Publication Data

US 2006/0224644 A1 Oct. 5, 2006

(51) Int. Cl.
*G06F 7/38* (2006.01)
(52) U.S. Cl. ..................................... 708/490
(58) Field of Classification Search ................. 708/490, 708/200, 671
See application file for complete search history.

(56) References Cited

U.S. PATENT DOCUMENTS

| | | | |
|---|---|---|---|
| 6,016,043 A * | 1/2000 | Motzko et al. | 318/606 |
| 6,775,414 B1 * | 8/2004 | Fogg et al. | 382/246 |
| 2005/0125590 A1 * | 6/2005 | Li et al. | 710/317 |

* cited by examiner

*Primary Examiner*—Tan V Mai
(74) *Attorney, Agent, or Firm*—McAndrews Held & Malloy, Ltd.

(57) ABSTRACT

Presented herein are system(s), method(s), and apparatus for detecting end of slice groups in a video bitstream. In one embodiment, there is presented a circuit for extracting a data structure from one or more data words. The circuit comprises a multiplexer, a bit pointer, a first logic circuit, and a comparator. The multiplexer provides one or more bits from the one or more data words. The bit pointer points to the bits following the provided one or more bits in the one or more data words. The first logic circuit examines at least portions of the data words for an end of data structure code, the at least portions comprising the one or more bits, and provides an indicator indicating the position of the end of data structure code. The comparator compares the indicator to where the bit pointer points.

14 Claims, 4 Drawing Sheets

SYSTEM(S), METHOD(S), AND APPARATUS FOR DETECTING END OF SLICE GROUPS IN A BITSTREAM

RELATED APPLICATIONS

This application is related to "SYSTEM(S), METHOD(S), AND APPARATUS FOR EXTRACTING SLICES FROM BITSTREAM", Ser. No. 11/095,371, filed Mar. 30, 2005, by Kishore, which is incorporated herein by reference for all purposes.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Video compression standards use a variety of techniques to compress video data. The techniques include both lossy and lossless compression. The lossy compression typically takes advantage of spatial and temporal redundancies in the video data.

In a number of standards, such as MPEG-2, and Advanced Video Coding (AVC) (also known as the ITU-H.264 Specification, and MPEG-4, Part 10), pictures from the video data are divided into blocks. Reference frames are examined for similar blocks, and the blocks of a picture are coded as the difference between themselves and a similar block in the reference picture (known as the prediction error). Blocks from an area are grouped together forming what is known as a macroblock. The macroblocks are grouped together into groups forming what is known as a slice.

Generally, the slices are encoded using lossless coding, and the coding of symbols within a slice are dependent on other symbols of the slice. Although error detecting and correcting codes are used, enough errors in a slice can render the slice irrecoverable.

A picture includes a number of slice groups, each of which are lossless coded independent of each other. Accordingly, in the event that a burst error renders one slice irrecoverable, the remaining slice groups of the picture can be decoded. This can even perceptually mask the burst error to the viewer.

Decoders typically include buffers for storing a received bitstream comprising encoded video data. The buffer stores the bitstream as datawords. The datawords can vary in length, but there are advantages in storing the bitstream in wide datawords, such as 256-bit/32-byte words, known as Jumbo words (Jwords).

The bitstream is read by a variable length decoder. The variable length decoder decodes lossless codes encoding the video data. As noted above, the slice groups are losslessly encoded independent with respect to each other, however, the symbols within a slice group are encoded dependent on each other. Accordingly, the variable length decoder decodes the video data on a slice by slice basis.

The slices in the buffer do not necessarily begin and end at the boundaries of the data word. However, the memory controller fetches the video data at data word boundaries. As a result, when the memory controller fetches the data words storing a slice group, there is likely to be leading data before the slice group and trailing data following the slice group.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Presented herein is are system(s), method(s), and apparatus for detecting end of slice groups in a bitstream.

In one embodiment, there is presented a circuit for extracting a data structure from one or more data words. The circuit comprises a multiplexer, a bit pointer, a first logic circuit, and a comparator. The multiplexer provides one or more bits from the one or more data words. The bit pointer points to the bits following the provided one or more bits in the one or more data words. The first logic circuit examines at least portions of the data words for an end of data structure code, where the at least portions comprise the one or more bits, and provides an indicator indicating the position of the end of data structure code. The comparator compares the indicator to where the bit pointer points.

In another embodiment, there is presented a method for extracting a data structure from one or more data words. The method comprises providing one or more bits from the one or more data words; pointing to bits following the provided one or more bits in the one or more data words; examining at least portions of the data words for an end of data structure code, where the at least portions comprise the one or more bits; providing an indicator indicating the position of the end of data structure code; and comparing the indicator to the position of the bits following the one or more bits to the indicator.

These and other advantages and novel features of the present invention, as well as details of an illustrated embodiment thereof, will be more fully understood from the following description and drawings.

DETAILED DESCRIPTION OF THE INVENTION

Figure 1:
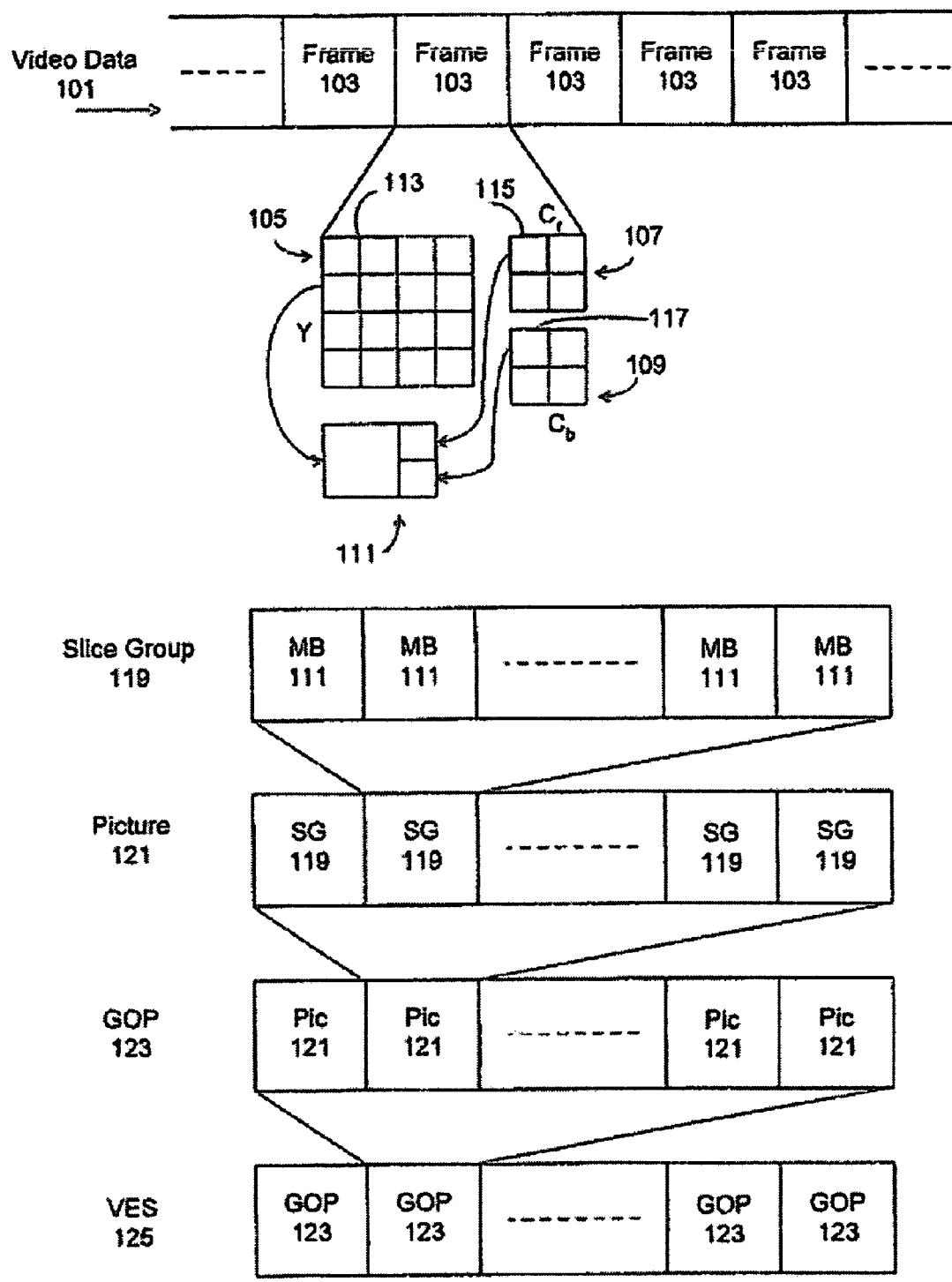
FIG. 1 is a block diagram describing the coding of exemplary video data.

FIG. 1 illustrates a block diagram of an exemplary Moving Picture Experts Group (MPEG) encoding process of video data 101, in accordance with an embodiment of the present invention. The video data 101 comprises a series of frames 103. Each frame 103 comprises two-dimensional grids of luminance Y, 105, chrominance red Cr, 107, and chrominance blue $C_b$, 109, pixels. The two-dimensional grids are divided into 8×8 blocks, where a group of four blocks or a 16×16 block 113 of luminance pixels Y is associated with a block 115 of chrominance red $C_r$, and a block 117 of chrominance blue $C_b$ pixels. The block 113 of luminance pixels Y, along with its corresponding block 115 of chrominance red pixels $C_r$, and block 117 of chrominance blue pixels $C_b$ form a data structure known as a macroblock 111. The macroblock 111 also includes additional parameters, including motion vectors, explained hereinafter. Each macroblock 111 represents image data in a 16'16 block area of the image.

The data in the macroblocks 111 is compressed in accordance with algorithms that take advantage of temporal and spatial redundancies. For example, in a motion picture, neighboring frames 103 usually have many similarities. Motion causes an increase in the differences between frames, the difference being between corresponding pixels of the frames, which necessitate utilizing large values for the transformation from one frame to another. The differences between the frames may be reduced using motion compensation, such that the transformation from frame to frame is minimized. The idea of motion compensation is based on the fact that when an object moves across a screen, the object may appear in different positions in different frames, but the object itself does not change substantially in appearance, in the sense that the pixels comprising the object have very close values, if not the same, regardless of their position within the frame. Measuring and recording the motion as a vector can reduce the picture differences. The vector can be used during decoding to shift a macroblock 111 of one frame to the appropriate part of another frame, thus creating movement of the object. Hence, instead of encoding the new value for each pixel, a block of pixels can be grouped, and the motion vector, which determines the position of that block of pixels in another frame, is encoded.

Accordingly, most of the macroblocks 111 are compared to portions of other frames 103 (reference frames). When an appropriate (most similar, i.e. containing the same object(s)) portion of a reference frame 103 is found, the differences between the portion of the reference frame 103 and the macroblock 111 are encoded. The location of the portion in the reference frame 103 is recorded as a motion vector. The encoded difference and the motion vector form part of the data structure encoding the macroblock 111. In the MPEG-2 standard, the macroblocks 111 from one frame 103 (a predicted frame) are limited to prediction from portions of no more than two reference frames 103. It is noted that frames 103 used as a reference frame for a predicted frame 103 can be a predicted frame 103 from another reference frame 103.

The macroblocks 111 representing a frame are grouped into different slice groups 119. The slice group 119 includes the macroblocks 111, as well as additional parameters describing the slice group. Each of the slice groups 119 forming the frame form the data portion of a picture structure 121. The picture 121 includes the slice groups 119 as well as additional parameters that further define the picture 121.

The pictures are then grouped together as a group of pictures (GOP) 123. The GOP 123 also includes additional parameters further describing the GOP. Groups of pictures 123 are then stored, forming what is known as a video elementary stream (VES) 125. The VES 125 is then packetized to form a packetized elementary sequence.

The VES 125 is coded using lossless coding, such as variable length coding. The variable length coding uses variable length codes to code data. The variable length codes are generally interdependent with respect to one another. Accordingly, the decoding of a variable length code is dependent on a previously decoded variable length code.

In the case of transmission errors brought on by noise during transmission of the VES 125, a variable length code can be corrupted. Although error detecting and correcting codes are used, enough errors can corrupt a variable length code. A corrupted variable length code can potentially propagate itself, causing errors in decoding other variable length codes that are dependent on the corrupted variable length code. To limit how far a corrupted variable length code can propagate, the variable length coding for each slice group is independent with respect to other slice groups. Thus, corrupted variable length codes in one slice group are prevented for propagating errors in another slice group.

Figure 2:
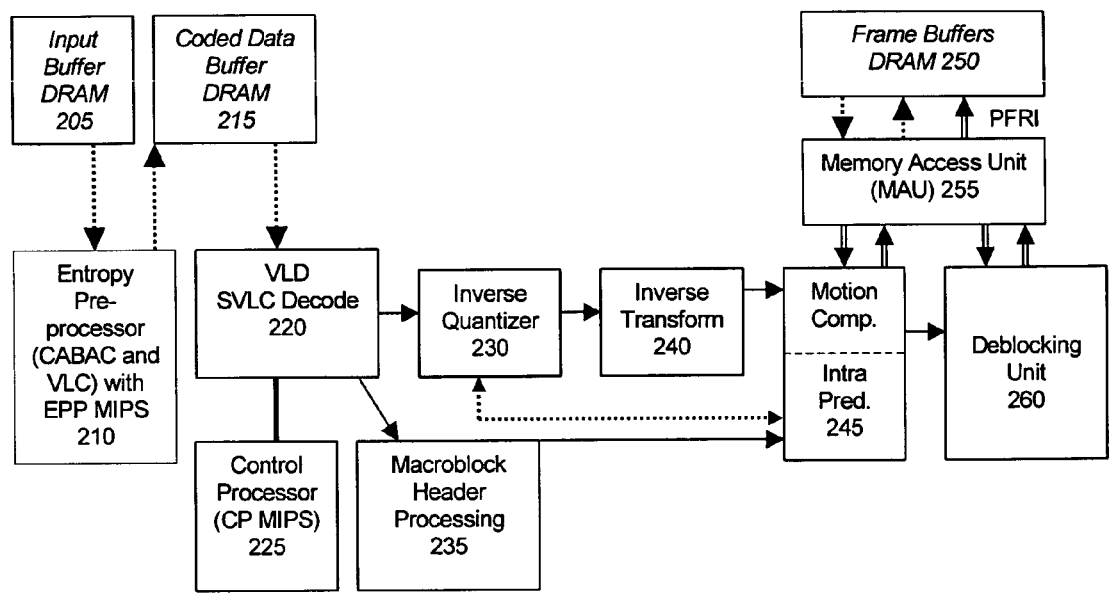
FIG. 2 is a block diagram of a video decoder in accordance with an embodiment of the present invention.

Referring now to FIG. 2, there is illustrated a block diagram describing an exemplary video decoder system 200 in accordance with an embodiment of the present invention. The video decoder 200 comprises an input buffer DRAM 205, an entropy pre-processor 210, a coded data buffer DRAM 215, a variable length code decoder 220, a control processor 225, an inverse quantizer 230, a macroblock header processor 235, an inverse transformer 240, a motion compensator and intrapicture predictor 245, frame buffers 250, a memory access unit 255, and a deblocker 260.

The input buffer DRAM 205, entropy pre-processor 210, coded data buffer DRAM 215, and variable length code decoder 220 together decode the variable length coding associated with the video data, resulting in pictures 100 represented by macroblocks 111.

The inverse quantizer 230 inverse quantizes the macroblocks 111, resulting in sets of the frequency coefficients. The macroblock header processor 235 examines side information, such as parameters that are encoded with the macroblocks 111. The inverse transformer 240 transforms the frequency coefficients, thereby resulting in the prediction error. The motion compensator and intrapicture predictor 245 decodes the macroblock 111 pixels from the prediction error. The decoded macroblocks 111 are stored in frame buffers 250 using the memory access unit 255. A deblocker 260 is used to deblock adjacent macroblocks 111.

The coded data buffer DRAM 215 stores the encoded video data for the variable length decoder. According to certain embodiments, the coded data buffer DRAM 215 stores the encoded video data as 256-bit/32 byte data words, known as Jumbo words (Jwords).

As noted above, the variable length codes are data dependent with respect to each other within a slice group 119. However, the variable length coding for each slice group 119 is independent with respect to other slice groups 119. Accordingly, variable length decoder 220 decodes the slice groups 119 on a slice-by-slice basis. However, the slice groups 119 do not necessarily start or end on Jword boundaries in the coded data buffer DRAM 215.

Figure 3:
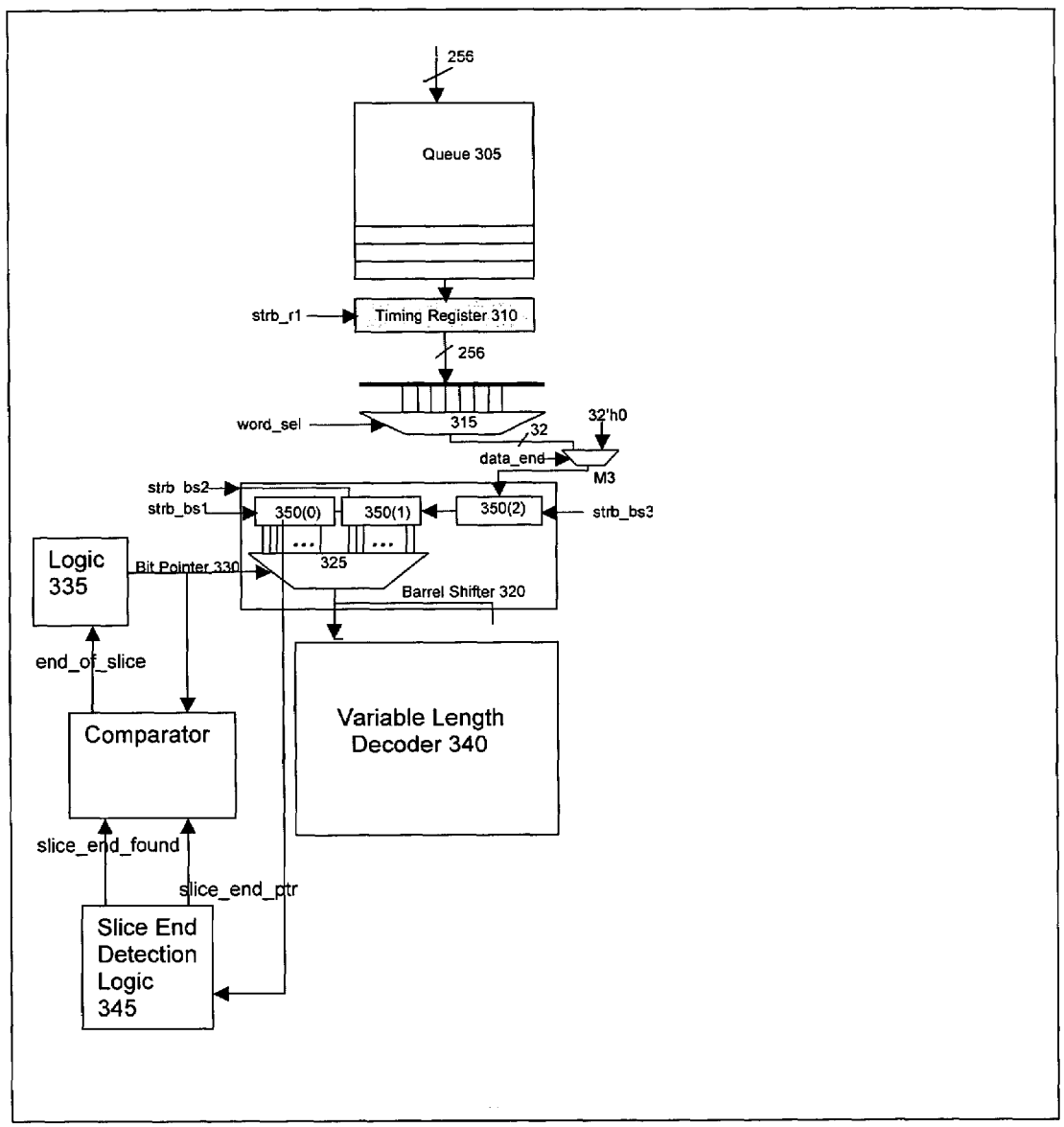
FIG. 3 is a block diagram of a variable length decoder in accordance with an embodiment of the present invention.

Referring now to FIG. 3, there is illustrated a block diagram of an exemplary variable length decoder 220 in accordance with an embodiment of the present invention. The variable length decoder 220 comprises a queue 305, a timing register 310, multiplexer 315, a barrel shifter 320, a bit pointer 330, bit pointer logic 335, a variable length code decoder 340, slice end detection logic 345, and a comparator 347.

The queue 305 receives and stores the video data as sequential data words. According to certain aspects of the present invention, the data words can comprise Jwords. A timing register 310 provides data words to the multiplexer 315.

The multiplexer 315 divides the data words into smaller data words. According to certain aspects of the present invention, the smaller data words can comprise 32 bits. The multiplexer 315 is a 256:32 multiplexer. The particular 32 bits selected by the multiplexer are determined by word select control signal word_sel. By incrementing the word select signal, the multiplexer 315 provides a sequence of smaller data words forming the data word.

The barrel shifter 320 receives the sequence of smaller data words. The barrel shifter 320 includes shift registers 350(0), 350(1), and 350(2), and multiplexer 325. The barrel shifter shifts the contents therein from shift register 350(2), to register 350(1), to register 350(0).

The slice end detection logic 345 receives the contents of the register 350(0) and examines the contents of the register 350 for the slice end code. When the slice end detection logic 345 detects the slice end code within the contents of the register 350(0), the slice end detection logic 345 asserts a signal indicating that the slice end is detected slice_end_found, and provides an indicator slice_end_ptr indicating the bit position where the slice end is found. The slice end detection logic 345 provides signal slice_end_found and indicator slice_end_ptr to the comparator 347.

The multiplexer 325 provides one or more bits at a time from the register 350(0) and register 350(1) to the variable length code decoder 340. As each of the one or more bits is provided by multiplexer 320 to the variable length code decoder 340, logic 335 increments the bit pointer 330 to point to the next bit.

The comparator 347 is capable of providing a signal end_of_slice that prevents the logic 335 from incrementing the bit pointer. The comparator 347 receives the bit pointer, indicator slice_end_ptr, and signal slice_end_found. When the signal slice_end_found is asserted, the comparator 347 compares where the bit pointer 330 points to the indicator slice_end_ptr. Where the foregoing are equal, the comparator 347 asserts the signal end_of_slice signal. The signal end_of_slice prevents the logic 335 from incrementing the bit pointer 330.

In the foregoing manner, the bit pointer 330 is prevented from pointing to the portion of a byte following the slice end. According to certain aspects of the present invention, the logic 335 can then increment the bit pointer 330 to point to the next byte. According to other aspects of the present invention, the controller 220 reinitializes the bit pointer 330 to point to the byte where the next slice group starts. According to certain embodiments of the present invention, the slice end detection logic 345 receives the smaller data word from register 350(0) at an earlier or substantially same time that the multiplexer 325 provides the bits therefrom to the variable length code decoder 340, the slice end detection logic 345 is capable of detecting the slice end code substantially faster than the variable length code decoder 340 can decode the bits.

When the bit pointer 330 points to a bit in register 350(1), the contents of register 350(1) are shifted to register 350(0), and the contents of register 350(2) are shifted to register 350(1). The multiplexer 315 provides the next smaller data word to the shift register 350(2), and the word select signal word_sel is incremented.

Where the word select signal word_sel has pointed to the last smaller data word forming the data word received by the multiplexer 315, the timing register 310 provides the next data word form the queue 305 to the multiplexer 315 and the word select signal word_sel is reset.

Figure 4:
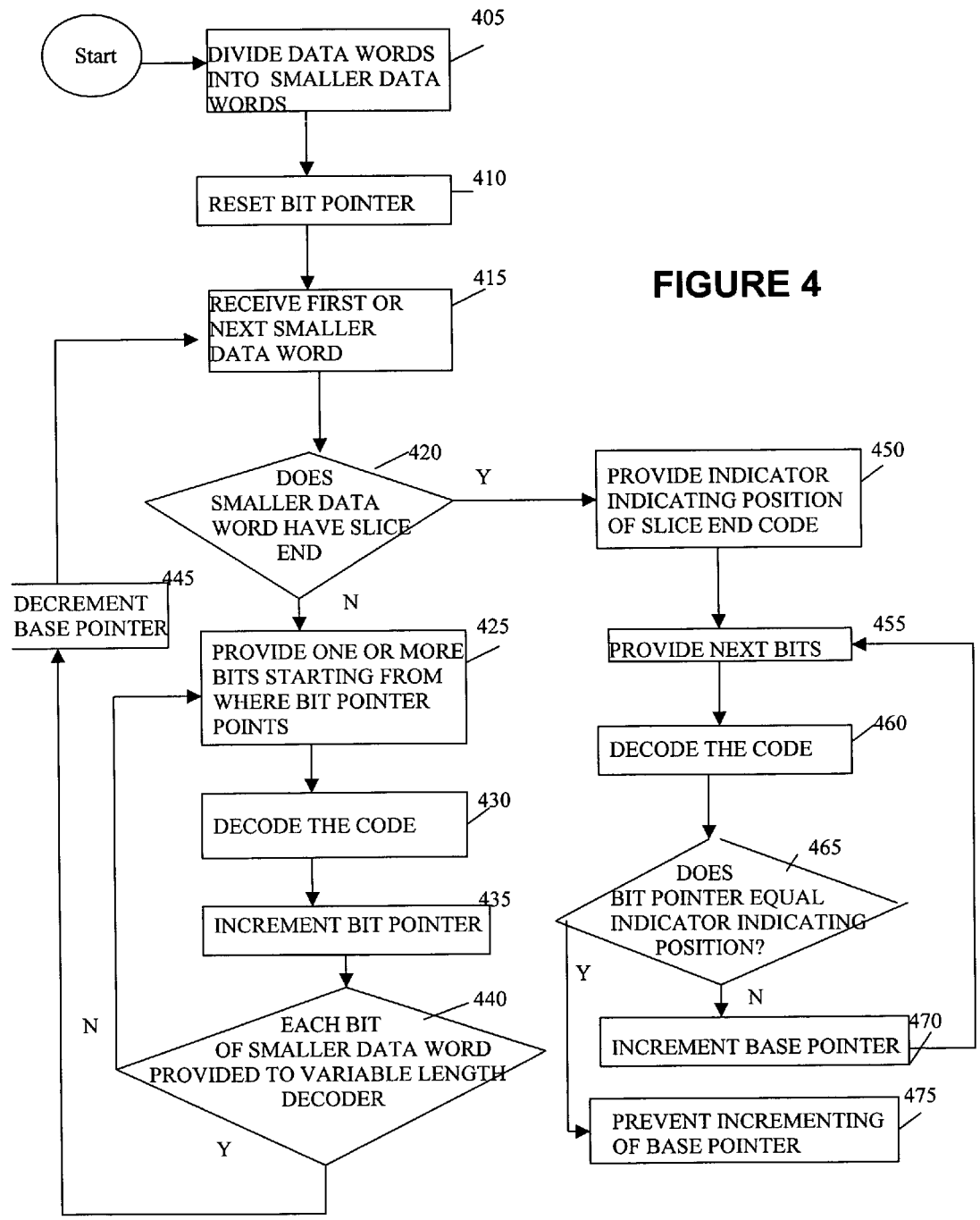
FIG. 4 is a flow diagram for detecting end of slice groups in accordance with an embodiment of the present invention.

Referring now to FIG. 4, there is illustrated a flow diagram for detecting the end of slice group in accordance with an embodiment of the present invention. At 405, the multiplexer 315 divides a data word into a sequence of smaller data words. At 410, the bit pointer 330 is reset to point to the first bit in the smaller data word stored in the register 350(0). At 415, the register 350(0) receives either the first of the smaller data words, or next sequential one of the smaller data words. According to certain aspects of the present invention, the next smaller data word can be received by shifting the contents of register 350(1) into register 350(0).

At 420, the slice detection logic 345 examines the smaller data word for the slice end code. If the slice detection logic 345 does not find the slice end code in the smaller data word at 420, a code word comprising one or more bits, the multiplexer 325 provides (425) one or more bits starting from the position pointed to, by the bit pointer 330 to the variable length code decoder 340. The variable length code decoder 340 decodes the code at 430. At 435, the logic 335 increments the base pointer 330 to point to the next bit following the provided bits during 425.

At 440, if each bit of the smaller data word in register 350(0) is not provided to the variable length code decoder 340, 425 is repeated. If at 440, each bit of the smaller data word in register 350(0) is provided to the variable length code decoder 340, the bit pointer 330 is decremented at 445, and 415 is repeated.

If at 420, the slice detection logic 345 detects the slice end code, at 450 the slice detection logic 345 provides an indicator slice_end_ptr indicating the position of the slice end code to the comparator 347. At 455, the multiplexer 325 provides a code comprising one or more bits starting at where the base pointer 330 points to the variable length code decoder 340 for decoding (460).

At 465, the comparator 347 compares the indicator slice_end_ptr to where the base pointer 330 points. If at 465, the indicator slice_end_ptr does not equal where the base pointer 330 points, the base pointer 330 is incremented at 470 and 455 is repeated.

If at 465, the indicator slice_end_ptr does equal where the base pointer 330 points, the comparator 347 asserts and provides the signal end_of_slice to the logic 335. The signal end_of_slice prevents (470) the logic 335 from incrementing the base pointer.

The embodiments described herein may be implemented as a board level product, as a single chip, application specific integrated circuit (ASIC), or with varying levels of the decoder system integrated with other portions of the system as separate components. The degree of integration of the decoder system will primarily be determined by the speed and cost considerations. Because of the sophisticated nature of modern processor, it is possible to utilize a commercially available processor, which may be implemented external to an ASIC implementation. If the processor is available as an ASIC core or logic block, then the commercially available processor can be implemented as part of an ASIC device wherein certain functions can be implemented in firmware. Alternatively, the functions can be implemented as hardware accelerator units controlled by the processor. In one representative embodiment, the encoder or decoder can be implemented as a single integrated circuit (i.e., a single chip design).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. For example, although the embodiments have been described with a particular emphasis on the MPEG-2 standard, the teachings of the present invention can be applied to many other standards without departing from it scope. Therefore, it is intended that the present invention not be limited to the particular embodiment disclosed, but that the present invention will include all embodiments falling within the scope of the appended claims.

The invention claimed is:

1. A circuit for extracting a data structure from one or more data words, said circuit comprising:
   a multiplexer for providing one or more bits from the one or more data words;
   a bit pointer for pointing to bits following the provided one or more bits in the one or more data words;

a first logic circuit for examining at least portions of the data words for an end of data structure code, the at least portions comprising the one or more bits, and providing an indicator indicating the position of the end of data structure code; and a comparator for comparing the indicator to where the bit pointer points.

2. The circuit of claim 1, further comprising:

a second logic circuit for incrementing the bit pointer to point to the bit following the provided one or more bits.

3. The circuit of claim 2, wherein the comparator provides a signal to the second logic circuit when the indicator and where the bit pointer points are equal.

4. The circuit of claim 3, wherein the signal prevents the second logic from incrementing the bit pointer.

5. The circuit of claim 3, wherein the second signal causes the second logic circuit to increments the bit pointer to point to the next byte.

6. The circuit of claim 1, wherein the data words comprise 256 bits.

7. The circuit of claim 1, wherein the at least a portion of the data words comprises smaller data words, and wherein the circuit further comprises:

another multiplexer for dividing the data words into smaller data words.

8. The circuit of claim 7, further comprising:

a queue for sequentially providing the data words to the another multiplexer.

9. The circuit of claim 1, further comprising:

a variable length code decoder for decoding the one or more bits.

10. The circuit of claim 1, wherein the data structure is a slice group.

11. The circuit of claim 1, further comprising:

a barrel shifter for providing the at least a portions of the data words to the first logic.

12. The circuit of claim 1, wherein the barrel shifter further comprises:

a first shift register for storing a first at least a portion;

a second shift register for storing a second at least a portion; and wherein the first shift register provides the first at least a portion to the first logic circuit.

13. A circuit for extracting a data structure from one or more data words, said circuit comprising:

a multiplexer for providing one or more bits from the one or more data words;

a bit pointer for pointing to bits following the provided one or more bits in the one or more data words;

a first logic circuit for examining at one least portion of the one or more data words for an end of data structure code, the at least one portion comprising the one or more bits, and providing an indicator indicating the position of the end of data structure code; and a comparator for comparing the indicator to where the bit pointer points.

14. A circuit for extracting a data structure from a plurality of data words, said circuit comprising:

a multiplexer for providing one or more bits from the plurality of data words;

a bit pointer for pointing to bits following the provided one or more bits in the plurality of data words;

a first logic circuit for examining at least portions of the plurality of data words for an end of data structure code, the at least portions comprising the one or more bits, and providing an indicator indicating the position of the end of data structure code; and a comparator for comparing the indicator to where the bit pointer points.

* * * * *

UNITED STATES PATENT AND TRADEMARK OFFICE
CERTIFICATE OF CORRECTION

PATENT NO. : 7,610,325 B2 Page 1 of 1
APPLICATION NO. : 11/092209
DATED : October 27, 2009
INVENTOR(S) : Kishore et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1247 days.

Signed and Sealed this

Twelfth Day of October, 2010

David J. Kappos
*Director of the United States Patent and Trademark Office*